United States Patent
Wanke et al.

(10) Patent No.: US 6,957,873 B2
(45) Date of Patent: Oct. 25, 2005

(54) METHOD FOR REGULATING THE DRIVING STABILITY OF A VEHICLE

(76) Inventors: Peter Wanke, Budapester Str. 8, Frankfurt Main (DE), 60437; Martin Kümmel, Heidenweg 2, Spangenberg (DE), 34286; Henning Raulfs, Karthauser 4, Bad Homburg (DE), 61352; Alexander May, Schlusselackerweg 12, Althengstett (DE), 75382

(*) Notice: Subject to any disclaimer, the term of this patent is extended or adjusted under 35 U.S.C. 154(b) by 0 days.

(21) Appl. No.: 10/415,618
(22) PCT Filed: Oct. 30, 2001
(86) PCT No.: PCT/EP01/12524
§ 371 (c)(1), (2), (4) Date: Oct. 17, 2003
(87) PCT Pub. No.: WO02/36401
PCT Pub. Date: May 10, 2002

(65) Prior Publication Data
US 2004/0046447 A1 Mar. 11, 2004

(30) Foreign Application Priority Data
Nov. 3, 2000 (DE) .......................... 100 54 647

(51) Int. Cl.⁷ .............................. B60T 8/00; B60T 8/60; B62D 37/00
(52) U.S. Cl. ........................ 303/140; 701/41; 701/48; 303/146
(58) Field of Search ................. 303/140–148, 303/166, 113.2; 180/197, 248; 701/41, 48, 70–89, 301, 90

(56) References Cited

U.S. PATENT DOCUMENTS

| | | | | |
|---|---|---|---|---|
| 6,349,998 B1 | * | 2/2002 | Franke et al. | 303/148 |
| 2004/0046447 A1 | * | 3/2004 | Wanke et al. | 303/140 |

FOREIGN PATENT DOCUMENTS

| | | |
|---|---|---|
| DE | 4109925 | 10/1991 |
| DE | 4419650 | 7/1995 |
| DE | 19503148 | 8/1995 |
| DE | 19634188 | 2/1997 |
| DE | 19813736 | 10/1998 |
| DE | 19814889 | 10/1998 |
| DE | 19733676 | 2/1999 |
| DE | 19958895 | 6/2000 |
| DE | 010054647 A1 * | 5/2002 |
| WO | WO 02/36401 A1 * | 5/2002 |

OTHER PUBLICATIONS

Search Report of the German Patent Office for Appln 10054647.1.

* cited by examiner

Primary Examiner—Douglas C. Butler

(57) ABSTRACT

In a method for regulating the driving stability of a vehicle pressures for individual brakes of the vehicle are determined in dependence on several input quantities so that the driving stability is enhanced by brake interventions at individual wheels. To enhance the driving stability of a vehicle, it is determined during stable driving performance whether in view of a highly dynamic steering maneuver there is a tendency to a subsequent unstable driving performance, and in this case brake pre-intervention will occur already when the vehicle exhibits a stable driving performance.

11 Claims, 2 Drawing Sheets

METHOD FOR REGULATING THE DRIVING STABILITY OF A VEHICLE

TECHNICAL FIELD OF THE INVENTION

The present invention relates to a method for regulating the driving stability, wherein pressures for individual brakes of the vehicle are determined in dependence on several input quantities so that the driving stability is enhanced by brake interventions at individual wheels.

BACKGROUND OF THE INVENTION

Abrupt steering and counter-steering maneuvers in e.g. obstacle avoidance maneuvers, when changing lanes, free style, and like maneuvers may cause instabilities of the vehicle at a high coefficient of friction. There is an increased risk of rollover for vehicles with a high center of gravity.

A great number of driving stability control systems are known in the art in order to automatically counteract these vehicle instabilities. The term 'driving stability control' covers five principles for influencing the driving performance of a vehicle by means of predeterminable pressures or brake forces in or at individual wheel brakes and by means of intervention into the engine management of the driving engine. These systems concern brake slip control (ABS) preventing the locking of individual wheels during a braking operation, traction slip control (TCS) preventing the spinning of the driven wheels, electronic brake force proportioning (EBP) regulating the ratio of brake forces between front axle and rear axle of the vehicle, anti rollover braking (ARB) preventing rollover of the vehicle about its longitudinal axis, as well as yaw torque control (ESP—Electronic Stability Program) ensuring stable driving conditions during yawing of the vehicle about the vertical axis.

Hence, 'vehicle' in this connection refers to a motor vehicle with four wheels which is equipped with a hydraulic, an electro-hydraulic, or electromechanical brake system. In the hydraulic brake system, the driver can build up brake pressure by means of a pedal-operated master cylinder, while the electro-hydraulic and electromechanical brake systems develop brake force in response to the sensed braking request of the driver. A hydraulic brake system will be referred to in the following. Each wheel has a brake with which each one inlet valve and one outlet valve is associated. The wheel brakes are in connection to the master cylinder by way of the inlet valves, while the outlet valves lead to a non-pressurized reservoir or low-pressure accumulator. There is still provision of an auxiliary pressure source that is able to develop pressure in the wheel brakes even irrespective of the position of the brake pedal. The inlet and outlet valves are electromagnetically operable for pressure control in the wheel brakes.

To detect conditions related to driving dynamics, there are four rotational speed sensors, one per wheel, a yaw rate sensor, a lateral acceleration sensor, and at least one pressure sensor for the brake pressure generated by the brake pedal. Instead of the pressure sensor, a pedal travel sensor or pedal force sensor may also be used, if the auxiliary pressure source is so arranged that it is impossible to make a distinction between brake pressure built up by the driver and pressure from the auxiliary pressure source.

In a driving stability control operation the driving behavior of a vehicle is influenced in such a manner that the driver can better master it in critical situations. A critical situation in this respect refers to an unstable driving condition during which the vehicle—in the extreme case—will not follow the specifications of the driver. Thus, in situations of this type, the function of the driving stability control involves imparting the performance desired by the driver to the vehicle within physical limits.

While the longitudinal slip of the tires on the roadway is primarily important for brake slip control, traction slip control, and electronic brake force proportioning, further quantities such as yaw velocity and sideslip angle gradient are included in yaw torque control (YTC). Rollover control systems typically evaluate quantities relating to lateral acceleration or rolling moments (DE 196 32 943 A1).

It would be desirable to generally avoid unstable driving situations, which are frequently not mastered by the driver so that critical driving situations cannot occur anyway.

German application DE 42 01 146 A1 discloses a system for predicting the performance of a motor vehicle and for a control based thereon, said system including a large number of acceleration sensors whose data is evaluated by means of complex calculations.

SUMMARY OF THE INVENTION

An object of the present invention is to provide a method of controlling the driving stability that permits a quickest possible reaction to predicted unstable driving situations by means of an intervention weakening or avoiding critical driving situations.

This object is achieved by the present invention in that a generic method is implemented so that during stable driving performance it is determined whether in view of a highly dynamic steering maneuver there is a tendency to a subsequent unstable driving performance, and that in this case brake pre-intervention will occur already when the vehicle exhibits a stable driving performance.

The result is that a critical driving situation, already when it develops, is either avoided or reduced to an extent to be mastered by the driver. By way of the brake system and sensor system already used in an ESP control system, including the equipment of four wheel speed sensors,
pressure sensor (P),
lateral acceleration sensor (LA),
yaw rate sensor (YR),
steering wheel angle sensor (SWA),
individually controllable wheel brakes,
hydraulic unit (HCU), and
electronic control unit (ECU), forecasting a critical driving situation and, preferably, avoiding it can be achieved without additional sensors. The critical driving situation is predicted in view of a highly dynamic steering action requiring detection of the steering wheel angle as the only value. In this event, determining the steering wheel angle velocity will necessitate only little time. It is therefore advisable to take into account especially this measured or calculated steering wheel angle velocity to predict an unstable driving performance, with a view to being able to take correcting steps at an early point of time, namely before other test results permit a forecast.

For an early forecast of unstable driving conditions, a highly dynamic steering maneuver is detected in dependence on the time variation of the steering wheel angle velocity.

It is appropriate that the variation between leaving a tolerance band indicating a stationary stable driving performance and the steering wheel angle velocity entering into the tolerance band is evaluated.

Favorably, a highly dynamic steering maneuver is detected when the following conditions are satisfied:

a.) $|SWAP_{MAX}|/(T_2-T_1)>$threshold value 1
b.) $|SWAP_{MAX}|/(T_3-T_2)>$threshold value 2
c.) $|SWAP_{MAX}|>$threshold value 3 wherein SWAP=steering wheel angle velocity, $SWAP_{MAX}$=maximum of the steering wheel angle velocity, $T_1$=point of time of the steering wheel angle velocity leaving the tolerance band, $T_2$=point of time of the maximum of the steering wheel angle velocity, $T_3$=point of time of entry of the steering wheel angle velocity into the tolerance band. In a.), the average steering wheel angle velocity is measured until the maximum steering wheel angle velocity is reached and in b.), the average steering wheel angle velocity until the entry into the tolerance band is measured. If these test values are in excess of the threshold values S1 or S2, respectively, steering can be estimated as being highly dynamic. With condition c.), the maximum of the steering wheel angle velocity itself is evaluated. If this velocity is above the given threshold value S3, it may be assumed that the amount of the steering amplitude is high enough to cause an unstable driving performance (driving condition).

To avoid unstable driving performance, brake pre-intervention is already effected favorably when the driving performance is stable, when at time $T_3$ of the entry of the steering wheel angle velocity into the tolerance band the amounts of the yaw rate and/or the lateral acceleration are in excess of predetermined threshold values S7 or S8, respectively. The yaw rate and the transverse acceleration are, hence, taken into account for activating a step that corrects the vehicle performance, namely a brake pre-intervention. The yaw rate and the lateral acceleration herein support the steering wheel angle velocity signal, with the information about whether there is a high coefficient of friction. When the amounts of the yaw rate and lateral acceleration are above the threshold values S7 and S8, brake pre-intervention is effected on the curve-outward front wheel.

Advantageously, the threshold values S1 to S9 and the brake torque generated by the brake pre-intervention are dependent on the vehicle speed $v_{Ref}$ and/or the maximum of the steering wheel angle velocity. In this arrangement, the generated brake torque is the greater the higher the vehicle speed and/or the greater the maximum of the steering wheel angle velocity is. The threshold values S1 to S9 decrease with increasing vehicle speed and, with the exception of S3, increase with an increasing maximum of the steering wheel angle velocity.

It is expedient that the brake pre-intervention takes place as long as the condition $|SWAP_t-SWAP_{MAX}|/(t-T_2)>$threshold value 4 is satisfied, meaning as long as there is a likewise highly dynamic counter-steering motion after a highly dynamic steering maneuver has been detected. This prevents an implausibly long brake pre-intervention from being carried out after a highly dynamic steering maneuver ending into a stationary cornering maneuver.

In extreme counter-steering maneuvers during cornering with a high lateral acceleration, rolling motions (rebound and compress) are produced due to the high rate of transverse vehicle body dynamics. The vehicle becomes destabilized, with the imminent risk of rollover about the longitudinal axis. Therefore, another objective of the invention is to improve upon a generic method so that it is determined in a stable cornering maneuver whether in view of the steering wheel angle velocity and the lateral acceleration there is a tendency to a subsequent unstable driving performance, and that in this case a brake pre-intervention occurs already when the vehicle exhibits a stable driving performance.

It is suitable that when changing the steering direction (zero crossing of the steering wheel angle=SWA($T_4$)) the brake pre-intervention is activated when the following conditions are satisfied:

SWAP<threshold value 5 and
LA>threshold value 6
or
SWAP>threshold value 5 and
LA<threshold value 6;

wherein SWAP=steering wheel angle velocity, LA=lateral acceleration. The sense of direction (definition of the sign), whether it is a right-hand or left-hand bend, may be chosen freely. For example, the condition SWAP<threshold value 5 can correspond to a change from a left-hand bend to a right-hand bend.

The brake pre-intervention is terminated when at least one of the following conditions is satisfied:

a.) $|C1*SWAP+SWA|<$threshold value 9 and/or
b.) a change in direction (zero crossing) of the yaw rate is detected after a yaw rate maximum and/or
c.) a maximum duration of intervention is exceeded.

Initially, a PD criterion for the combined evaluation of the steering wheel angle (proportional part P) and the steering wheel angle velocity (differentiating part D) is produced in condition a.) and compared with the threshold value S9. When the criterion is above the threshold value, meaning that the condition is not satisfied, the highly dynamic counter-steering maneuver still prevails at the time under review. Therefore the brake pre-intervention can be continued.

It is checked with condition b.) whether the brake pre-intervention was possibly too vigorous. This is the case when the vehicle does not follow at all the steering movement predetermined by the driver, i.e., the yaw rate effects a change in direction (zero crossing). It is inappropriate to continue the brake pre-intervention under these circumstances.

Condition c.) ensures a time limitation of the brake pre-intervention. It is suitable to arrange for the maximum duration of intervention in dependence on the vehicle speed and/or the measured lateral acceleration at the commencement of brake pre-intervention. The maximum duration of intervention is the longer the higher the vehicle speed or the lateral acceleration at the commencement of the intervention is.

The brake intervention preferably occurs at both front wheels. On the one hand, a higher total brake torque may be applied and, thus, the vehicle can be decelerated to a greater extent. On the other hand, the intervention at the curve-outward front wheel would have to be so intense that the thereby produced yaw torque would become excessive. Brake intervention at the curve-inward front wheel allows counteracting this excessive yaw torque.

During the counter-steering movements described the zero crossing of the yaw rate ($T_5$) follows the commencement of the intervention at both front wheels shortly after the zero crossing of the steering wheel angle ($T_4$). In the event of zero crossing of the yaw rate a change of sides of the curve-outward front wheel, which has already been pre-filled by the previous pressure build-up at both front wheels. This increases the pressure dynamics considerably and drastically reduces the delay time between the commencement of the intervention and reaching of the maximum brake torque.

To activate a correction, which is adapted to the forecast unstable driving performance, during the stable driving performance, the brake torque generated by way of the brake pre-intervention is dependent on the vehicle speed $v_{Ref}$ and/or the lateral acceleration and/or the steering wheel angle gradient. Advantageously, the duration of the brake pre-intervention is dependent on the vehicle speed $v_{Ref}$ and/or the lateral acceleration and/or the steering wheel angle gradient.

An embodiment of the invention is illustrated in the accompanying drawings and will be described in detail in the following.

DETAILED DESCRIPTION OF THE DRAWINGS

Figure 1:
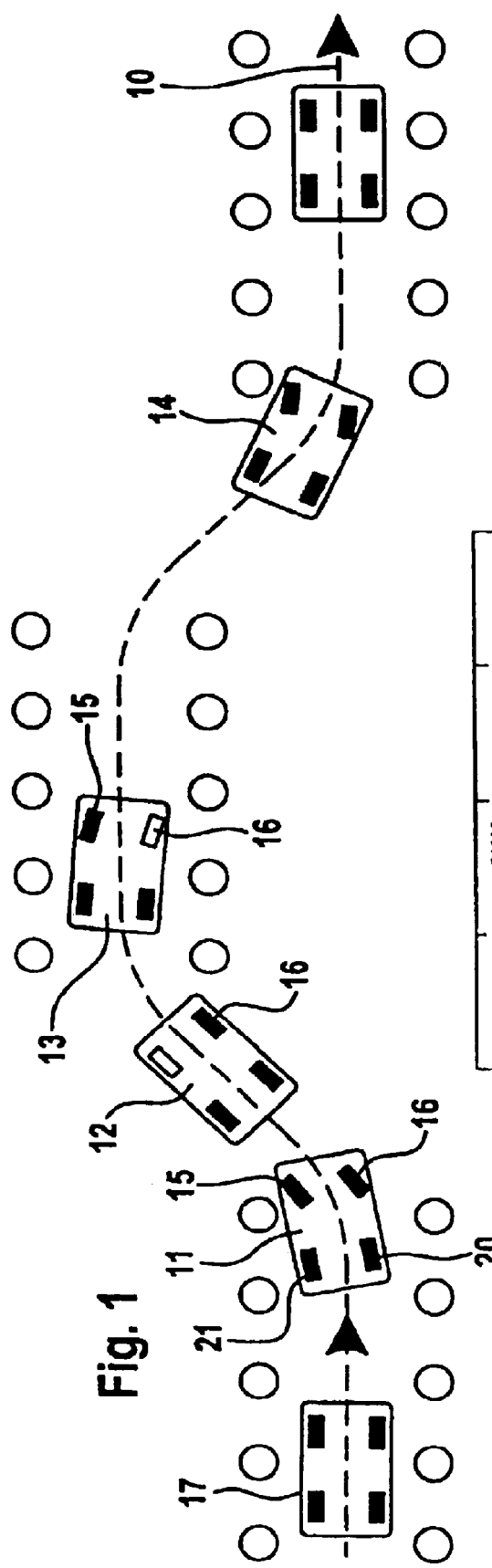
FIG. 1 is an example of a double lane change.

FIG. 1 shows a double lane change that can e.g. be desired when an obstacle must be avoided suddenly. Reference numeral 10 relates to the desired course; the vehicle moves alongside the positions 11, 12, 13 and 14. The vehicle passes through various situations. To pass through the desired course, especially at high speeds, initially a highly dynamic steering maneuver with a comparatively large steering angle or abrupt steering movement of the front wheels 15, 16 is necessary (position 11). Subsequently, there is a return steering movement with steering wheel angle zero crossing (position 12) and thereafter a counter-steering action at the end of the first lane change (position 13) and further to the second lane change (position 14). When a like maneuver takes place at a high coefficient of friction without deceleration, typically, the vehicle becomes automatically unstable between position 13 and position 14 starting from a determined combination of vehicle speed, steering dynamics and steering amplitude, that means the vehicle develops greater sideslip angles (>2 degrees) which no longer can be mastered by the driver. Especially in vehicles having a high center of gravity the lateral dynamics developing may induce pitching motions and rolling motions that will lead to rollover of the vehicle about the longitudinal axis in the most unfavorable case. An ESP controller can detect the unstable driving performance and intervene in a correcting fashion, but it is unable to prevent the occurrence of the unstable condition. To avoid this danger situation, it is necessary to reduce the vehicle speed as well as the steering dynamics by an early intense brake intervention according to the invention.

Figure 2:
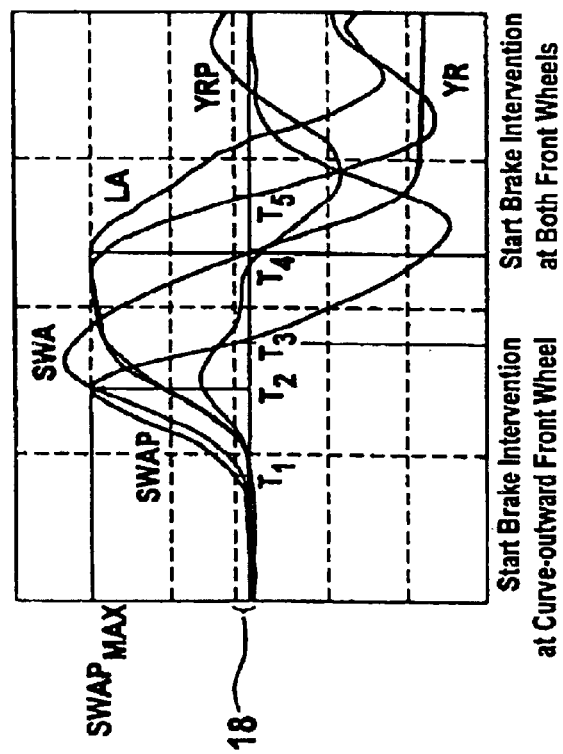
FIG. 2 shows signal sequences evaluated or produced according to the invention.

FIG. 2 shows the signal course during the first lane change (positions 11 to 13). When the vehicle assumes position 17, it exhibits a stable driving performance, that means the vehicle follows the driver's specifications without remarkable difference, the sideslip angle amounts to 0 degrees. The signals SWAP (steering wheel angle velocity), SWA (steering wheel angle), LA (lateral acceleration), YR (yaw rate) and (yaw velocity) provided by the control unit of the brake system in this stable driving condition are in a tolerance band 18 which is e.g. characterized by a steering wheel angle velocity less than 40 to 200 degrees/s. As is shown in FIG. 2 the situation described with respect to FIG. 1 (highly dynamic steering maneuver) can occur. The highly dynamic steering maneuver is determined from the variation of the steering wheel angle speed SWAP between leaving (time $T_1$) and entering (time $T_3$) the tolerance band 18. An unambiguous impulse of the steering wheel angle gradient SWAP characterizes a highly dynamic steering maneuver that is detected by way of the following conditions:

a.) $|SWAP_{MAX}|/(T_2-T_1)$>threshold value 1
b.) $|SWAP_{MAX}|/(T_3-T_2)$>threshold value 2
c.) $|SWAP_{MAX}|$>threshold value 3 wherein SWAP=steering wheel angle velocity, $SWAP_{MAX}$=maximum of the steering wheel angle velocity, $T_1$=point of time of the steering wheel angle velocity leaving the tolerance band 18, $T_2$=point of time of the maximum of the steering wheel angle velocity, $T_3$=point of time of entry of the steering wheel angle velocity into the tolerance band 18. Thus, the average steering wheel angle acceleration is determined until the maximum steering wheel angle velocity is reached, and the average steering wheel angle deceleration is determined until the entry into the tolerance band. When the steering wheel angle acceleration lies above a value in the range of 600 to 2000 degrees/s$^2$ (threshold value S1), the steering wheel angle deceleration lies above a value in the range of 800 and 2500 degrees/s$^2$ (threshold value S2) and the absolute value of the maximum $SWAP_{MAX}$ lies above a value in the range of 250 to 600 degrees/s$^2$ (threshold value S3), a steering maneuver may be evaluated as highly dynamic. The steering amplitude above S3 is so great that a tendency towards a subsequent unstable driving performance (driving condition) can be predicted.

When the conditions a.), b.), and c.) are satisfied and the absolute value of the yaw rate YR at the time $T_3$ of the entry of the steering wheel angle velocity lies above a value in the range of e.g. 20 to 40 degrees/s (threshold value 7) and the lateral acceleration LA lies above a value in the range of e.g. 4.5 to 8 m/s$^2$ (threshold value 8), the brake intervention is started at the curve-outward front wheel 16.

Figure 3:
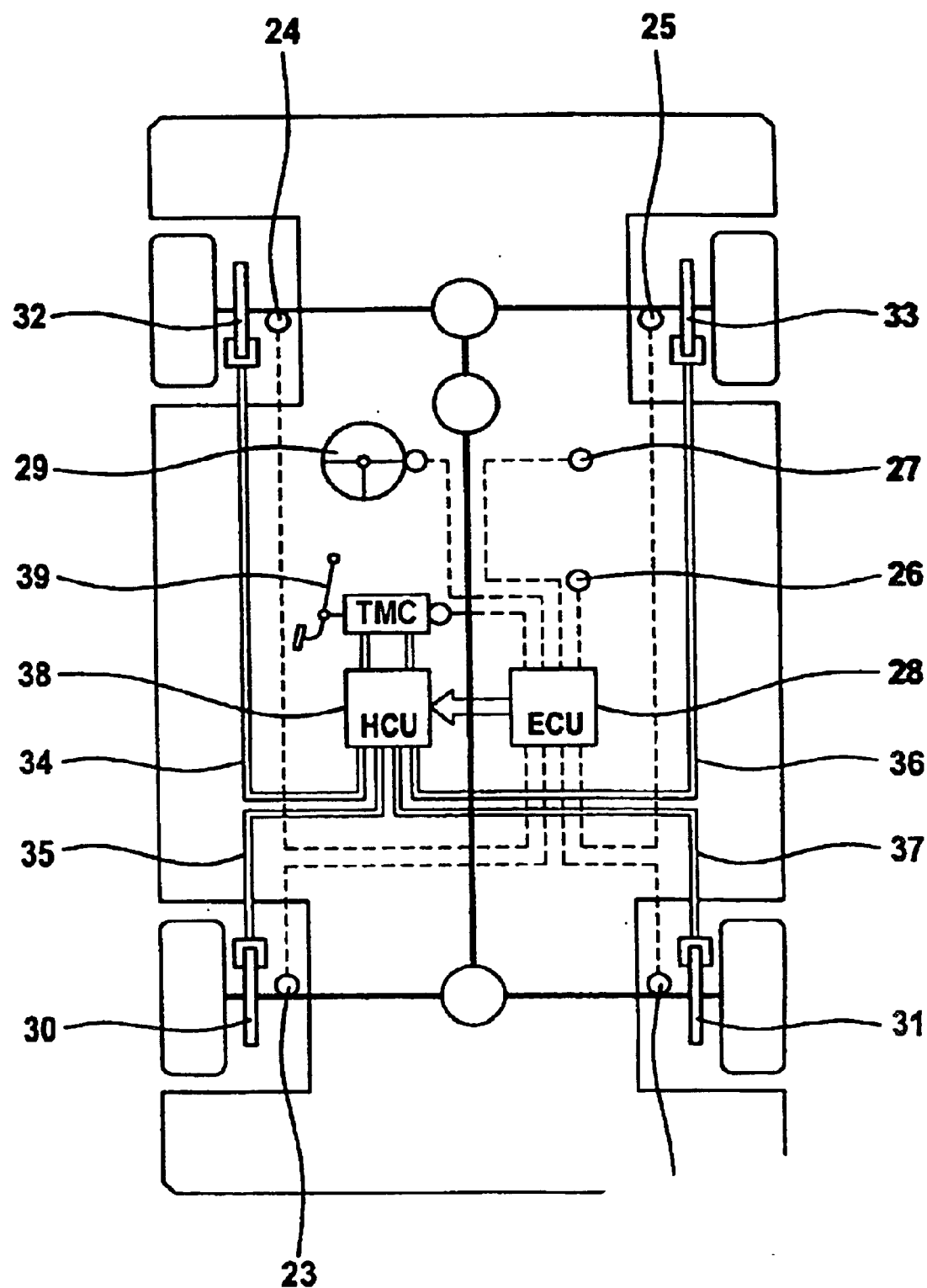
FIG. 3 shows a vehicle with the components of a driving dynamics control.

FIG. 3 shows a schematic view of a vehicle with a brake control system. Four wheels 15, 16, 20, 21 are illustrated in FIG. 3. One wheel sensor 22 to 25 is furnished on each of the wheels 15, 16, 20, 21. The signals are sent to an electronic component 28 determining the vehicle speed $v_{Ref}$ from the wheel rotational speeds by way of predefined criteria. Further, a yaw rate sensor 26, a lateral acceleration sensor 27, and a steering wheel angle sensor 29 are connected to the component 28. Each wheel further includes a wheel brake 30 to 33. These brakes are operated hydraulically and receive pressurized hydraulic fluid by way of hydraulic conduits 34 to 37. The brake pressure is adjusted by way of a valve block 38, said valve block being controlled irrespective of the driver by electric signals produced in the electronic control unit 28. The driver can introduce brake pressure into the hydraulic conduits by way of a master cylinder operated by a brake pedal. Pressure sensors that permit sensing the driver's braking request are provided in the master cylinder or the hydraulic conduits.

Control unit 28 serves to individually adjust the brake pressure in the wheel 16. The vehicle speed $v_{Ref}$ and the maximum steering wheel angle velocity $SWAP_{MAX}$ are monitored by way of the signals delivered by the steering wheel angle sensor 29 and by the wheel sensors 22 to 25. Actuating signals for the valves are generated in valve block 38 in response to the signals received. This produces a brake torque responsive to speed and to $SWAP_{MAX}$. The higher the vehicle speed and/or $SWAP_{MAX}$ the greater the brake torque is. The longitudinal force at the curve-outward front wheel is increased due to the introduced brake torque, whereas the lateral force is not reduced. Consequently, the front wheel 16 is operated with low slip values, whereby the vehicle is decelerated without excessively restricting its steerability. In parallel to the introduced brake torque all threshold values are also calculated in dependence on the vehicle speed $v_{Ref}$ and the maximum steering wheel angle velocity $SWAP_{MAX}$. The threshold values S1–S9 become lower with increasing $v_{Ref}$ and higher with increasing maximum SWAP (exception S3). The brake pre-intervention stays active until there is a likewise highly dynamic return steering movement after a highly dynamic steering maneuver. When the condition $|SWAP_t-SWAP_{MAX}|/(t-T_2)$>threshold value 4 (e.g. a value in the range of 800 to 3000 degrees/s$^2$) is satisfied, such a return steering movement is concluded and the brake pre-intervention is continued. Said intervention is terminated as soon as the above condition is no longer satisfied.

In an extreme counter-steering maneuver during cornering with a high lateral acceleration, the control unit 28 will activate the brake pre-intervention during change of the steering direction, i.e., at time $T_4$ of the zero crossing of the steering wheel angle. Control unit 28 individually adjusts brake pressure preferably in the front wheels 15, 16 according to the condition SWAP<400 to 1000 degrees/s$^2$ (threshold value 5) and
LA>5 to 10 m/s$^2$ (threshold value 6)
or
SWAP>threshold value 5 and
LA<threshold value 6.

The two conditions determine the passage from a left-hand to a right-hand curve or from a right-hand to a left-hand curve, said passage being dependent on the sign. The brake pre-intervention at the two front wheels 15, 16 renders it possible to reduce the vehicle speed $v_{Ref}$ with a simultaneous reduction of the lateral force of the curve-outward wheel 16, with the driving performance still stable. The brake torque generated in the brakes is dependent on $v_{Ref}$ as described above. The lateral acceleration LA and the steering wheel angle gradient SWAP are additionally monitored in the highly dynamic counter-steering maneuver during cornering. The lateral acceleration at time $T_4$ is an indicator how much the vehicle is compressed on the curve-outward side, i.e., how much energy is stored in the suspension system which can do rolling acceleration work during rebound after a change of curves. The steering wheel angle gradient at time $T_4$ indicates how quickly the change of curves and, thus, the change in directions of the centrifugal force occurs. The superposition of the roll accelerations, caused by the rebound work and the change in direction of the centrifugal force, can lead to the described vehicle instabilities and to rollover of the vehicle about the longitudinal axis. When the values of transverse acceleration and steering angle gradient at time $T_4$ are above the threshold values S5 or S6 and if they are opposed in the sense of direction, a brake pre-intervention is necessary.

The brake pre-intervention is terminated in accordance with the following conditions:

a.) |C1*SWAP+SWA|<40 to 200 degrees (threshold value 9) wherein C1=0.05 to 04 s
b.) a change in direction (zero crossing) of the yaw rate is determined after a yaw rate maximum
c.) the maximum duration of intervention is exceeded.

In a.) the steering wheel angle turn (proportional portion) and the steering wheel angle velocity (differentiating portion) are evaluated by means of a PD criterion. When the result of the evaluation is above a value in the range of e.g. 40 to 200/s (threshold value 9), the highly dynamic counter-steering movement continues to prevail, when it is below said value the brake pre-intervention will be terminated.

Further, the brake pre-intervention is terminated when the brake torque introduced at the curve-outward front wheel 16 was too high. This fact is assumed when the yaw rate executes a change in direction (zero crossing) after a brake pre-intervention.

Besides, the vehicle speed $v_{Ref}$ and the lateral acceleration LA are monitored, and the duration of intervention of the brake pre-intervention is limited according to these quantities. The maximum duration of intervention is the longer the higher the vehicle speed or the lateral acceleration at the commencement of intervention ($T_4$) is.

As FIG. 2 shows, the zero crossing of the yaw rate YR follows at the time $T_5$ after the time $T_4$ of the zero crossing of the steering wheel angle SWA. In the event of zero crossing of the yaw rate YR a change of sides of the curve-outward front wheel from 16 to 15 follows in position 13. The front wheel 15 is already pre-filled with hydraulic medium due to the preceding pressure build-up at both front wheels 15 and 16. This increases the pressure dynamics considerably. The maximum brake torque is applied immediately in the wheel brakes 30 to 33.

If the described brake pre-interventions were executed, the vehicle speed and, thus, the necessary lateral dynamics for following the desired course 10 is reduced in position 14 to such an extent that a new tendency to vehicle instability is unlikely to occur. The course of the signals under review around position 14 is similar to the course in positions 11 to 13, however, the threshold values are not reached. Thus, no brake pre-intervention occurs in position 14.

What is claimed is:

1. A method for regulating the driving stability of a four-wheeled steered vehicle with an individual wheel brake assigned to each wheel, comprising the steps of:

determining pressures for the individual brakes of the vehicle in dependence on several input quantities so that the driving stability is enhanced by brake interventions at individual wheels, determining during a stable driving performance whether in view of a highly dynamic steering maneuver there is a tendency to a subsequent unstable driving performance, and wherein in this case brake pre-intervention will occur already when the vehicle exhibits a stable driving performance, evaluating the variation between leaving a tolerance band indicating a stationary, stable driving performance and the entry of the steering wheel angle velocity into the tolerance band, detecting the highly dynamic steering maneuver is detected when the following conditions are satisfied:

a.) $|SWAP_{MAX}|/(T_2-T_1)$>threshold value 1,
   b.) $|SWAP_{MAX}|/(T_3-T_2)$>threshold value 2,
   c.) $|SWAP_{MAX}|$>threshold value 3;

wherein SWAP=steering wheel angle velocity,
   $SWAP_{MAX}$=maximum of the steering wheel angle velocity,
   $T_1$=point of time of the steering wheel angle velocity leaving the tolerance band,
   $T_2$=point of time of the maximum of the steering wheel angle velocity,
   $T_3$=point of time of entry of the steering wheel angle velocity into the tolerance band.

2. The method as claimed in claim 1, further including the step of:

detecting a highly dynamic steering maneuver in dependence on the time variation of a steering wheel angle velocity.

3. The method as claimed in claim 1, effecting the brake pre-intervention step when, at the time of the entry of the steering wheel angle velocity into the tolerance band, the amounts of at least one of the members of the group consisting of a vehicle yaw rate and a lateral vehicle acceleration is in excess of a predetermined respective threshold value.

4. The method as claimed in claim 1, further including the step of:

effecting brake pre-intervention on the curve-outward front wheel.

5. The method as claimed in claim 1, wherein threshold values and a brake torque generated by the brake pre-intervention are dependent on at least one of the following two quantities, vehicle speed $v_{Ref}$ and maximum of the velocity of the steering wheel angle.

6. The method as claimed in claim 1, wherein the brake pre-intervention takes place as long as the condition $|SWAP_t-SWAP_{MAX}|/(t-T_2)>$threshold value 4 is satisfied.

7. The method as claimed in claim 1, further including the step of:

activating the brake pre-intervention during a change of the steering direction (zero crossing of the steering wheel angle=$SWAT_4$) when the following conditions are satisfied:

SWAP<threshold value 5 and
LA>threshold value 6
or
SWAP>threshold value 5 and
LA<threshold value 6 wherein SWAP=steering wheel angle velocity, LA=lateral acceleration.

8. The method as claimed in claim 1, further including the step of:

terminating the brake pre-intervention when at least one of the following conditions is satisfied:

a.) $|CI*SWAP+SWA|$<threshold value 9;
b.) a change in direction (zero crossing) of the yaw rate is detected after a yaw rate maximum;
c.) the maximum duration of intervention is exceeded.

9. The method as claimed in claim 1, wherein the brake pre-intervention occurs at both front wheels.

10. The method as claimed in claim 1, wherein the brake torque generated by way of the brake pre-intervention is dependent on at least one of the elements of the group consisting of vehicle speed $v_{Ref}$, lateral acceleration, and steering wheel angle gradient.

11. The method as claimed in claim 1, wherein the duration of the brake pre-intervention is dependent on at least one of the elements of the group consisting of vehicle speed $v_{Ref}$, lateral acceleration, and steeling wheel angle gradient.

* * * * *